US011181996B2

(12) United States Patent
Koike

(10) Patent No.: US 11,181,996 B2
(45) Date of Patent: Nov. 23, 2021

(54) PEN

(71) Applicant: Wacom Co., Ltd., Saitama (JP)

(72) Inventor: Takeshi Koike, Kanagawa (JP)

(73) Assignee: Wacom Co., Ltd., Saitama (JP)

(*) Notice: Subject to any disclaimer, the term of this patent is extended or adjusted under 35 U.S.C. 154(b) by 111 days.

(21) Appl. No.: 16/599,065

(22) Filed: Oct. 10, 2019

(65) Prior Publication Data
US 2020/0225772 A1 Jul. 16, 2020

(30) Foreign Application Priority Data

Jan. 11, 2019 (JP) .............................. JP2019-003145

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01); *G06F 2203/0384* (2013.01)

(58) Field of Classification Search
CPC .... G06F 3/0383; G06F 3/03544; G06F 3/033; G06F 3/0354; G06F 3/0321; G06F 3/037; G06F 3/03545; G06F 3/03542; G06F 3/041; G06F 3/04162; G06F 3/0384; G06F 3/04101; G06F 3/04108
See application file for complete search history.

(56) References Cited

U.S. PATENT DOCUMENTS

| | | | |
|---|---|---|---|
| 5,317,502 A * | 5/1994 | Reiffel | G06F 3/0442 700/56 |
| 8,866,767 B2 | 10/2014 | Shahparnia et al. | |
| 10,401,985 B2 | 9/2019 | Hara et al. | |
| 2017/0083119 A1* | 3/2017 | Jensen | G06F 3/03545 |
| 2017/0285771 A1* | 10/2017 | Jung | G06F 3/0442 |
| 2017/0285772 A1* | 10/2017 | Yamamoto | G06F 3/046 |
| 2019/0179435 A1* | 6/2019 | Yuan | G06F 3/0383 |

FOREIGN PATENT DOCUMENTS

JP 6148423 B2 5/2017

* cited by examiner

*Primary Examiner* — William Boddie
*Assistant Examiner* — Jeffrey Parker
(74) *Attorney, Agent, or Firm* — Seed IP Law Group LLP

(57) ABSTRACT

A pen includes: an electrode; a power supply circuit which, in operation, supplies a first voltage; a low voltage integrated circuit (LVIC) coupled to the power supply circuit, wherein the LVIC, in operation, outputs a transmission signal at the first voltage; a high voltage integrated circuit (HVIC) including a level shifter which, in operation, outputs the transmission signal at a second voltage that is higher than the first voltage; an inter-IC wire which, in operation, supplies the transmission signal having the first voltage from the LVIC to the HVIC; an electrode wire which, in operation, supplies the transmission signal having the second voltage from the HVIC to the electrode; and a step-up circuit coupled to the power supply circuit, wherein the HVIC in operation, supplies the second voltage to the level shifter.

15 Claims, 7 Drawing Sheets

# PEN

BACKGROUND

Technical Field

The present disclosure relates to a pen, and more particularly, to a pen having a function of transmitting a signal at a high voltage of several tens of volts.

Background Art

Some pens (electronic pens) used with position detection devices such as tablet terminals transmit signals at a high voltage of several tens of volts. For example, U.S. Pat. No. 8,866,767 discloses a pen that transmits a high voltage signal of 10 to 20 volts to a position detection device. Japanese Patent No. 6148423 discloses a pen including a step-up circuit using a charge pump and a step-up circuit using a transformer.

In order to include internal circuits of a pen that transmits a signal at a high voltage in one integrated circuit (IC), all of the circuits need to be manufactured by a high-withstand voltage process. In other words, all of the circuits need to be manufactured by a process that enables the circuits to withstand high voltages. In this case, the circuit scale becomes larger and the circuit area increases. Moreover, power consumption increases. Therefore, there is a need for a pen capable of transmitting a signal at a sufficiently high voltage while achieving reduced circuit area and power consumption.

BRIEF SUMMARY

In view of the above-described situation, an object of the present disclosure is to provide a pen capable of transmitting a signal at a sufficiently high voltage while achieving reduced circuit area and power consumption.

A pen according to one aspect of the present disclosure includes: an electrode; a power supply circuit which, in operation, supplies a first voltage; a low voltage integrated circuit (LVIC) coupled to the power supply circuit, wherein the LVIC, in operation, outputs a transmission signal at the first voltage; a high voltage integrated circuit (HVIC) including a level shifter which, in operation, outputs the transmission signal at a second voltage that is higher than the first voltage; an inter-IC wire which, in operation, supplies the transmission signal having the first voltage from the LVIC to the HVIC; an electrode wire which, in operation, supplies the transmission signal having the second voltage from the HVIC to the electrode; and a step-up circuit coupled to the power supply circuit , wherein the step-up circuit, in operation, supplies the second voltage to the level shifter.

According to the present disclosure, since the transmission signal is generated by the LVIC, which is manufacturable by a low-withstand voltage process, the circuit area and power consumption of the HVIC, which needs to be manufactured by a high-withstand voltage process, can be reduced accordingly. Therefore, not only can a reduction in circuit area and power consumption be achieved, but also a signal can be transmitted at a sufficiently high voltage.

DETAILED DESCRIPTION

Hereinafter, embodiments of the present disclosure will be described in detail with reference to the accompanying drawings.

Figure 1:
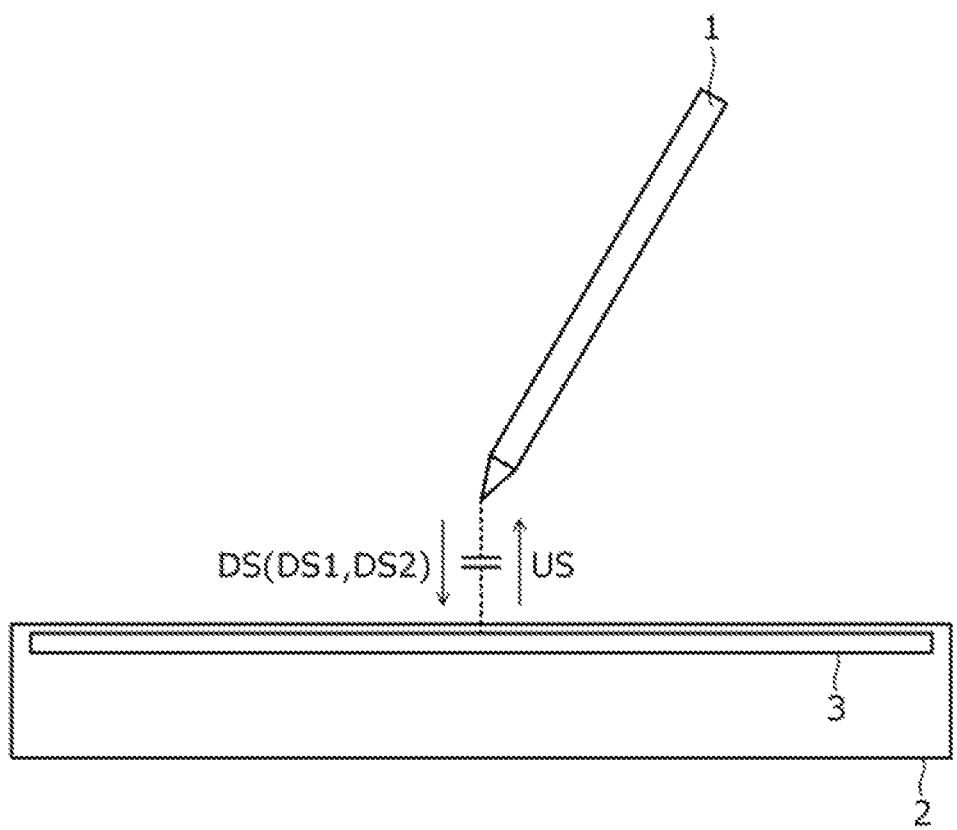
FIG. 1 is a diagram illustrating a pen and a position detection device according to a first embodiment of the present disclosure.

FIG. 1 is a diagram illustrating a pen 1 and a position detection device 2 according to the first embodiment of the present disclosure. As illustrated in FIG. 1, the pen 1 is a pen-type device and can be used while being held by a user's hand. The position detection device 2 is a computer having an input surface such as a tablet terminal and includes a sensor 3. Although not illustrated, the sensor 3 includes a plurality of linear electrodes. The plurality of linear electrodes is provided so as to cover the entire input surface.

Electrodes (a pen-tip electrode P0 and a ring electrode P1 described later) are provided at the tip of the pen 1. The pen 1 is capable of transmitting and receiving signals to and from the position detection device 2 via these electrodes. Among the signals transmitted and received in this manner, a signal transmitted from the position detection device 2 to the pen 1 will be hereinafter referred to as an uplink signal US (reception signal), while a signal transmitted from the pen 1 to the position detection device 2 will be hereinafter referred to as a downlink signal DS (transmission signal). As will be described in detail later, the downlink signal DS includes a downlink signal DS1 and a downlink signal DS2. The downlink signal DS1 is transmitted from the pen-tip electrode P0 described later. The downlink signal DS2 is transmitted from the ring electrode P1 described later. Specifically, transmission and reception of the uplink signal US and the downlink signal DS are performed via the capacitance formed between the electrodes of the pen 1 and each linear electrode included in the sensor 3, as illustrated in FIG. 1.

Figure 2:
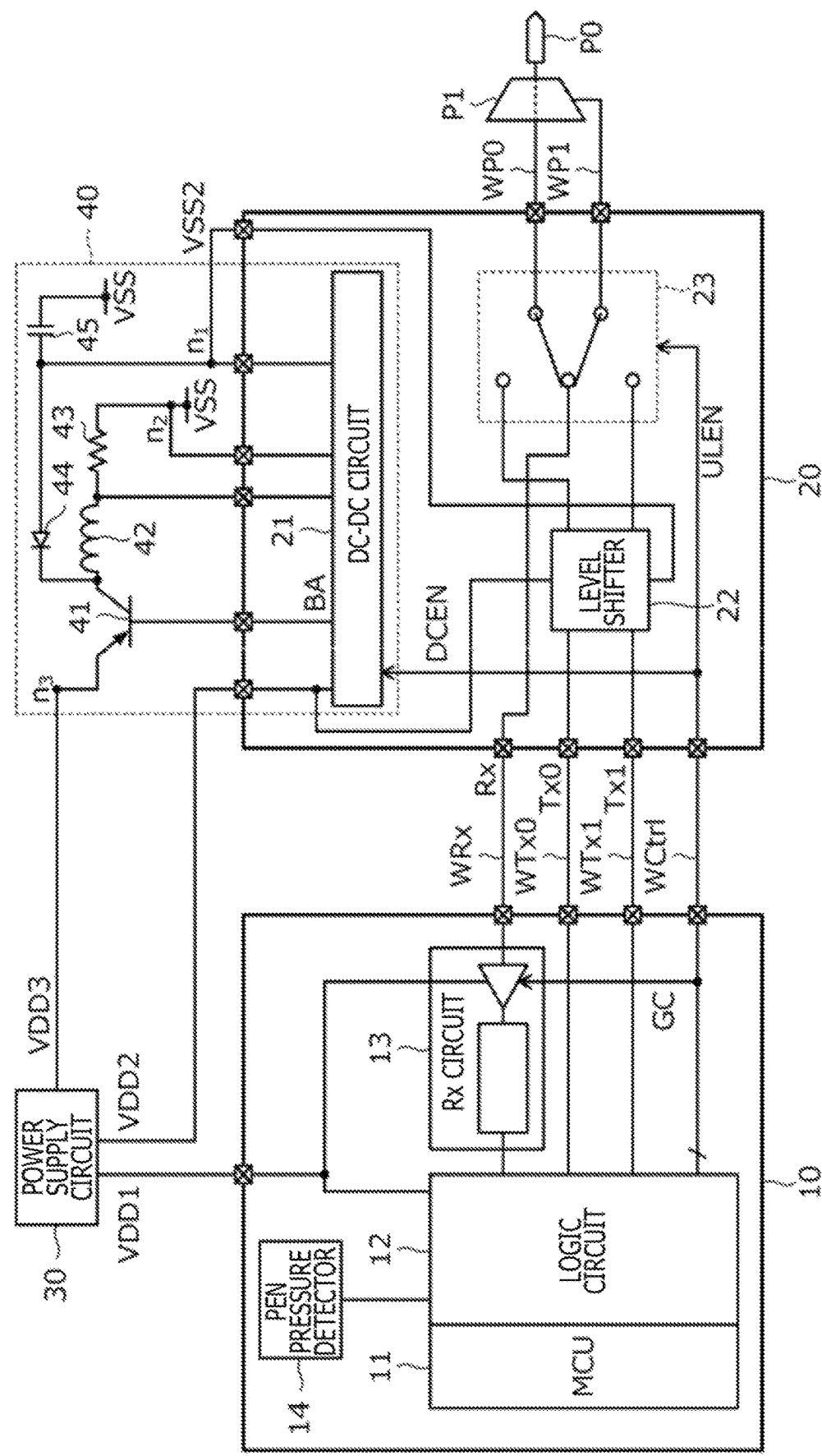
FIG. 2 is a diagram illustrating an internal configuration of the pen.

FIG. 2 is a diagram illustrating an internal configuration of the pen 1 according to the present embodiment. As illustrated in FIG. 2, the pen 1 includes the pen-tip electrode P0 (first electrode), the ring electrode P1 (second electrode), a low voltage integrated circuit (LVIC) 10, a high voltage integrated circuit (HVIC) 20, a power supply circuit 30, and a step-up circuit 40. The LVIC 10 is manufacturable by a low-withstand voltage process, while the HVIC 20 needs to be manufactured by a high-withstand voltage process. In other words, the LVIC 10 is manufacturable by a process that enables the LVIC 10 to withstand relatively low voltages, while the HVIC 20 needs to be manufactured by a process that enables the HVIC 20 to withstand relatively high voltages. The power supply circuit 30 has a function of generating three types of power supply potentials VDD1, VDD2, and VDD3 (for example, 1.8 volts, 5.0 volts, and 2.3 volts, respectively). A part of components included in the step-up circuit 40, specifically, a direct current to direct current (DC-DC) circuit 21 described later, is included in the HVIC 20, as will be described in detail later.

The pen-tip electrode P0 is an electrode provided at the tip of the pen 1 and is coupled to the HVIC 20 via an electrode wire WP0 (first electrode wire). The ring electrode P1 is a ring-shaped electrode provided so as to surround a pen axis and is coupled to the HVIC 20 via an electrode wire WP1 (second electrode wire). The electrode wire WP0 is shared between the downlink signal DS1 and the uplink signal US. The electrode wire WP1 is shared between the downlink signal DS2 and the uplink signal US.

The LVIC 10 and the HVIC 20 are coupled to each other via at least four inter-IC wires. The inter-IC wires are provided independently of each other. The four inter-IC wires include an inter-IC Rx wire WRx, an inter-IC Tx wire WTx0 (first inter-IC Tx wire), an inter-IC Tx wire WTx1 (second inter-IC Tx wire), and an inter-IC control wire WCtrl. The inter-IC Rx wire WRx is used to supply the uplink signal US from the HVIC 20 to the LVIC 10. The inter-IC Tx wire WTx0 is used to supply the downlink signal DS1 from the LVIC 10 to the HVIC 20. The inter-IC Tx wire WTx1 is used to supply the downlink signal DS2 from the LVIC 10 to the HVIC 20. The inter-IC control wire WCtrl is used to supply a control signal from the LVIC 10 to the HVIC 20. In the following description, an output terminal (terminal that outputs the uplink signal US received by the pen-tip electrode P0 or the ring electrode P1) of the HVIC 20 coupled to the inter-IC Rx wire WRx will be referred to as an Rx terminal. An input terminal (terminal that receives the downlink signal DS1) of the HVIC 20 coupled to the inter-IC Tx wire WTx0 will be referred to as a Tx0 terminal (first Tx terminal). An input terminal (terminal that receives the downlink signal DS2) of the HVIC 20 coupled to the inter-IC Tx wire WTx1 will be referred to as a Tx1 terminal (second Tx terminal).

A microcontroller unit (MCU) 11, a logic circuit 12, an Rx circuit 13, and a pen pressure detector 14 are provided inside the LVIC 10. The MCU 11 is a microcontroller unit that controls the entire pen 1. For example, the MCU 11 includes a processor and memory storing instructions that, when executed by the processor, causes the processor to control the entire pen 1. The Rx circuit 13 is a functional circuit that receives the uplink signal US via the inter-IC Rx wire WRx, demodulates the uplink signal US, and outputs the demodulated uplink signal US to the logic circuit 12. The Rx circuit 13 will be described in detail later with reference to FIGS. 5A to 5C. The pen pressure detector 14 is a functional circuit that detects pen pressure on the basis of the capacitance of a capacitive element (not illustrated). The capacitance of the capacitive element changes according to the pressure (pen pressure) applied to the tip of the pen 1. The pen pressure detected by the pen pressure detector 14 is supplied to the logic circuit 12.

The logic circuit 12 receives the uplink signal US via the Rx circuit 13 and generates the downlink signals DS1 and DS2 corresponding to the contents of the uplink signal US. The downlink signals DS1 and DS2 generated by the logic circuit 12 are supplied to the HVIC 20 via the inter-IC Tx wires WTx0 and WTx1, respectively.

The uplink signal US and the downlink signals DS1 and DS2 will be described in detail. The uplink signal US includes a symbol sequence that includes a predetermined detection pattern and a command for controlling the pen 1. The position detection device 2 illustrated in FIG. 1 converts each symbol included in the uplink signal US into spread codes (chip sequence) and modulates the obtained spread codes using a predetermined modulation method (for example, pulse width modulation). After the modulation, the position detection device 2 transmits the modulated spread codes from each linear electrode included in the sensor 3.

The downlink signal DS1 includes a burst signal and a data signal in this order. The burst signal is an unmodulated sine wave signal and is used to cause the position detection device 2 to detect the position of the pen 1. The data signal is a signal obtained by modulating a sine wave signal based on data requested for transmission by the command included in the uplink signal US. Examples of the data transmitted by the data signal include the pen pressure detected by the pen pressure detector 14. Additionally, in a case where the pen 1 includes a side switch or a tail switch, on/off information regarding these switches may be transmitted by the data signal. In a case where the pen 1 has been assigned an individual pen identification (ID), the pen ID may be transmitted by the data signal.

The downlink signal DS2 is a sine wave signal having a frequency different from the frequency of the downlink signal DS1 and is used to cause the position detection device 2 to detect the inclination of the pen 1. The downlink signal DS2 may be an unmodulated signal as a whole or may be a signal including a burst signal and a data signal similarly to the downlink signal DS1.

Returning to the description of the logic circuit 12, a drive circuit, not illustrated, is provided in an output stage of the logic circuit 12. The power supply potential VDD1 is supplied from the power supply circuit 30 to the drive circuit. Therefore, the downlink signals DS1 and DS2 output from the logic circuit 12 vibrate between the power supply potential VDD1 and a ground potential VSS. In other words, the logic circuit 12 outputs the downlink signals DS1 and DS2 at the power supply potential VDD1 (first voltage).

The logic circuit 12 also generates various types of control signals for controlling the HVIC 20 and supplies the control signals to the HVIC 20. The control signals supplied in this manner include a control signal DCEN (first control signal) for controlling the DC-DC circuit 21 (step-up circuit 40) described later and a control signal ULEN (second control signal) for controlling a high-voltage switch 23 described later. The details will be described later when each circuit is described.

The DC-DC circuit 21, a level shifter 22, and the high-voltage switch 23 are provided inside the HVIC 20.

The step-up circuit 40 includes the DC-DC circuit 21, in addition to a transistor 41, an external coil 42, a resistor 43, a diode 44, and a capacitor 45, which are provided outside the LVIC 10 and the HVIC 20. The DC-DC circuit 21 operates in response to the power supply potential VDD2 received from the power supply circuit 30. Basically, the DC-DC circuit 21 performs on/off control of a current that flows through an external coil 42. To control on/off of the current, the DC-DC circuit 21 controls on/off of the transistor 41 on the basis of a feedback input of a power supply potential VSS2 such that the difference between the power supply potential VDD2 and the power supply potential VSS2 becomes a predetermined value (for example, 20 volts). The power supply potential VSS2 is an output of the step-up circuit 40. By performing this control, the DC-DC circuit 21 causes the step-up circuit 40 to generate the power supply potential VSS2 (second voltage).

The DC-DC circuit 21 performs duty cycle control of a rectangular wave signal BA supplied to a control electrode of the transistor 41 to perform on/off control of the transistor 41. The DC-DC circuit 21 is controllable by the control signal DCEN supplied from the logic circuit 12. In a case where the control signal DCEN is active, the DC-DC circuit 21 performs duty cycle control of the rectangular wave signal BA. In a case where the control signal DCEN is inactive, the DC-DC circuit 21 keeps the rectangular wave signal BA inactive. Therefore, in a case where the control signal DCEN is active, the step-up circuit 40 generates the power supply potential VSS2. In a case where the control signal DCEN is inactive, the step-up circuit 40 does not generate the power supply potential VSS2.

A configuration and operation of the step-up circuit 40 will be described in detail below. An output terminal of the step-up circuit 40 from which the power supply potential VSS2 is output will be hereinafter referred to as a first node n1. A ground terminal of the step-up circuit 40 to which the ground potential VSS is supplied will be hereinafter referred to as a second node n2. An input terminal of the step-up circuit 40 to which the power supply potential VDD3 is supplied from the power supply circuit 30 will be hereinafter referred to as a third node n3.

The transistor 41, the external coil 42, and the resistor 43 are coupled in series in this order between the third node n3 and the second node n2. The transistor 41 is, for example, a PNP-type bipolar transistor. An emitter of the transistor 41 is coupled to the third node n3, while a collector of the transistor 41 is coupled to the external coil 42. The rectangular wave signal BA is supplied from the DC-DC circuit 21 to a base of the transistor 41. A coil having an inductance of 1 µH or higher is used as the external coil 42 to sufficiently increase the absolute value of the power supply potential VSS2. A cathode of the diode 44 is coupled to the collector of the transistor 41, while an anode of the diode 44 is coupled to the first node n1. The capacitor 45 is coupled between the first node n1 and the second node n2.

With the above-described configuration, in a case where the rectangular wave signal BA has been activated and the transistor 41 has been turned on, current flows from the first node n1 to the second node n2 through the diode 44 and the external coil 42. This decreases the voltage at the first node n1 (=power supply potential VSS2), resulting in an increase in the difference between the power supply potential VDD2 and the power supply potential VSS2. In this manner, the step-up circuit 40 steps up voltage.

The DC-DC circuit 21 monitors the power supply potential VSS2, which is a feedback input. When the power supply potential VSS2 has become a predetermined value or lower (for example, −15 volts or lower), the DC-DC circuit 21 deactivates the rectangular wave signal BA. Consequently, the transistor 41 is turned off and the step-up operation of the step-up circuit 40 is stopped. This, as a result, decreases the difference between the power supply potential VDD2 and the power supply potential VSS2. After that, the DC-DC circuit 21 continues to monitor the power supply potential VSS2 and activates the rectangular wave signal BA again when the power supply potential VSS2 has increased to the predetermined value or higher. Consequently, the transistor 41 is turned on and the step-up operation of the step-up circuit 40 is restarted. This, as a result, increases the difference between the power supply potential VDD2 and the power supply potential VSS2. In this manner, the step-up circuit 40 generates the power supply potential VSS2.

Returning to the description of the internal configuration of the HVIC 20, the level shifter 22 is a circuit that performs an amplification process on each of the downlink signals DS1 and DS2 supplied from the LVIC 10 via the inter-IC Tx wires WTx0 and WTx1, respectively, and outputs the downlink signals DS1 and DS2 at a voltage, that is, the second voltage (=VDD2−VSS2), corresponding to the difference between the power supply potential VDD2 supplied from the power supply circuit 30 and the power supply potential VSS2 supplied from the step-up circuit 40. The downlink signals DS1 and DS2 output from the level shifter 22 vibrate between the power supply potential VDD2 and the power supply potential VSS2.

The high-voltage switch 23 has a function of switching the destination to which the electrode wire WP0 is coupled between the Rx terminal and the Tx0 terminal while switching the destination to which the electrode wire WP1 is coupled between the Rx terminal and the Tx1 terminal. The high-voltage switch 23 is controllable by the control signal ULEN supplied from the LVIC 10. Considering that the high voltage downlink signals DS1 and DS2 pass through the high-voltage switch 23, the high-voltage switch 23 withstands at least the voltage (=VDD2−VSS2) of the downlink signals DS1 and DS2 output from the level shifter 22. For example, in a case where the voltage of the downlink signals DS1 and DS2 is 10 volts, the high-voltage switch 23 withstands at least a voltage of 10 volts.

Figure 3:
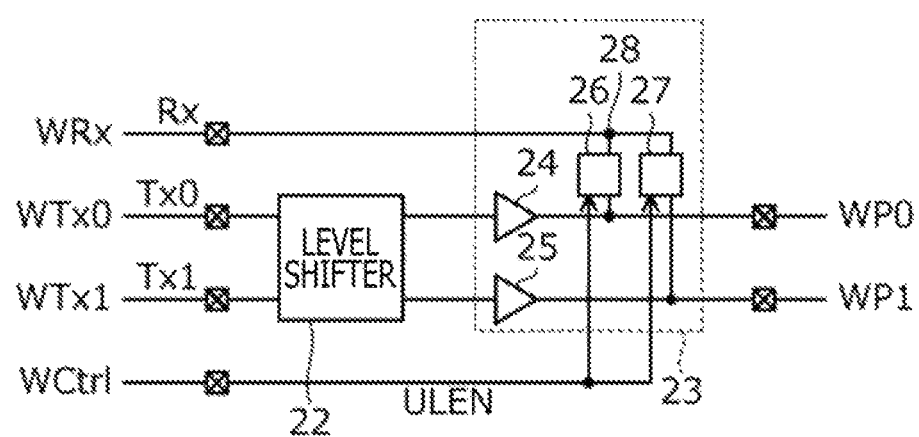
FIG. 3 is a diagram illustrating an exemplary configuration of a high-voltage switch.

FIG. 3 is a diagram illustrating an exemplary configuration of the high-voltage switch 23. As illustrated in FIG. 3, the high-voltage switch 23 includes drive circuits 24 and 25 and switch circuits 26 and 27. These circuits will be described in detail below.

The drive circuits 24 and 25 function as buffers for the downlink signals DS1 and DS2, respectively. Specifically, each of the drive circuits 24 and 25 preferably includes a circuit including a complementary metal-oxide semiconductor (CMOS). The downlink signal DS1 output from the level shifter 22 is supplied to the electrode wire WP0 via the drive circuit 24. The downlink signal DS2 output from the level shifter 22 is supplied to the electrode wire WP1 via the drive circuit 25.

The switch circuit 26 switches a coupling state between the Rx terminal and the electrode wire WP0 according to the control signal ULEN supplied from the logic circuit 12. The switch circuit 27 switches a coupling state between the Rx terminal and the electrode wire WP1 according to the control signal ULEN supplied from the logic circuit 12. The logic circuit 12 generates the control signal ULEN such that at the time of reception of the uplink signal US, the Rx terminal is coupled to both the electrode wires WP0 and WP1, while at the time of transmission of the downlink signals DS1 and DS2, the Rx terminal is decoupled from both the electrode wires WP0 and WP1. The Rx terminal and the inter-IC Rx wire WRx are provided commonly for the electrodes P0 and P1. At the time of reception of the uplink signal US, the switch circuits 26 and 27 operate such that the electrode wires WP0 and WP1 are merged at a merging circuit 28 illustrated in FIG. 3 and coupled to the Rx terminal.

The switch circuits 26 and 27 also function as Rx guard circuits that prevent the downlink signals DS1 and DS2 from flowing into the Rx terminal. This is because when the electrode wires WP0 and WP1 are coupled to the Rx terminal to receive the uplink signal US, there is a possibility that a high voltage remaining in the electrode wires WP0 and WP1 flows into the Rx terminal and breaks the Rx circuit 13. The details will be described below with reference to FIGS. 4A to 4C.

Figure 4A:
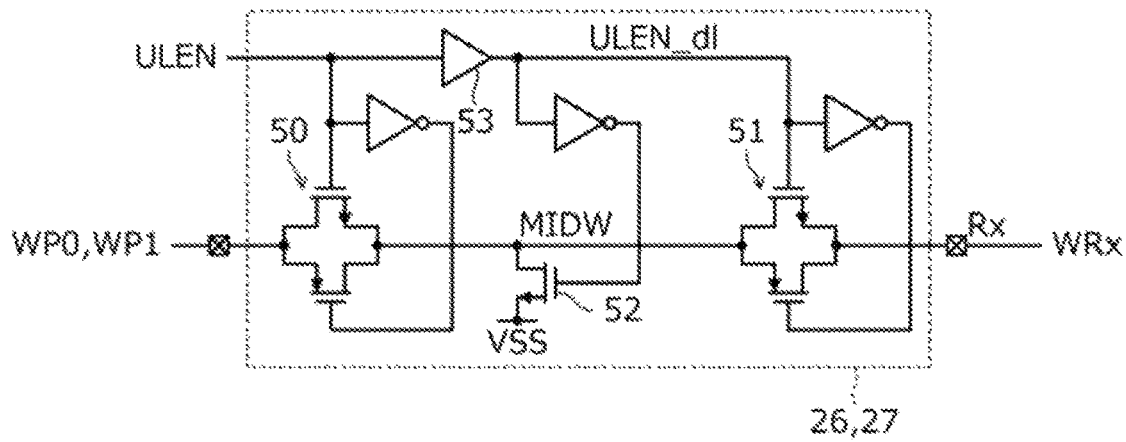
FIG. 4A is a diagram illustrating internal configurations of switch circuits.
Figure 4B:
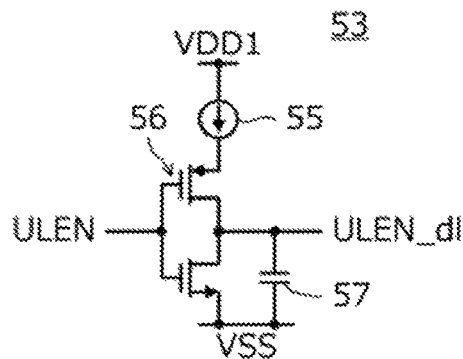
FIG. 4B is a diagram illustrating an internal configuration of a buffer circuit illustrated in FIG. 4A.
Figure 4C:
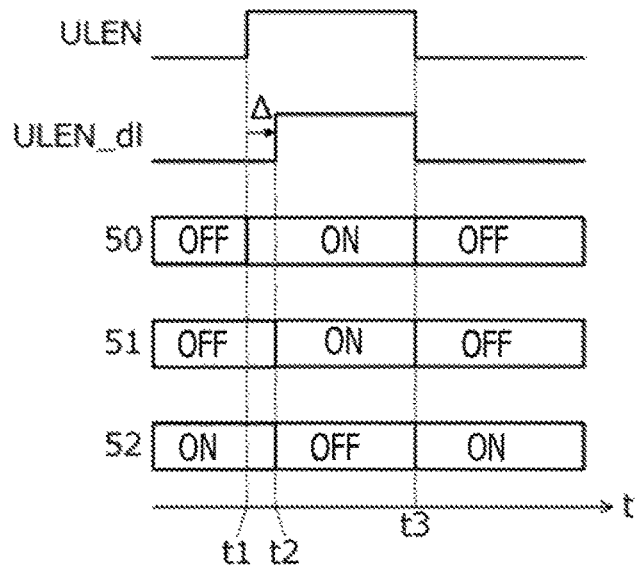
FIG. 4C is a waveform diagram for describing operation of the switch circuits.

FIG. 4A is a diagram illustrating internal configurations of the switch circuits 26 and 27. FIG. 4B is a diagram illustrating an internal configuration of a buffer circuit 53 illustrated in FIG. 4A. FIG. 4C is a waveform diagram for describing operation of the switch circuits 26 and 27.

Referring to FIG. 4A, each of the switch circuits 26 and 27 includes CMOS switch circuits 50 and 51, an N-channel metal-oxide semiconductor (NMOS) 52, and the buffer circuit 53.

As illustrated in FIG. 4B, the buffer circuit 53 includes a constant current circuit 55, a CMOS gate circuit 56, and a capacitor 57. The control signal ULEN is supplied to an input terminal of the CMOS gate circuit 56. A control signal ULEN_dl is output from an output terminal of the CMOS gate circuit 56. The constant current circuit 55 is provided between a power supply wire to which the power supply potential VDD1 is supplied from the power supply circuit 30 illustrated in FIG. 2 and a higher-side power supply terminal of the CMOS gate circuit 56. The capacitor 57 is provided between the output terminal of the CMOS gate circuit 56 and the ground terminal of the CMOS gate circuit 56.

The control signal ULEN is a rectangular wave signal as illustrated in FIG. 4C. When the control signal ULEN has been input into the input terminal of the CMOS gate circuit 56, a signal is output from the CMOS gate circuit 56. This signal is used to charge the capacitor 57 until the capacitor 57 is fully charged. As a result, a rising edge of the control signal ULEN_dl output from the buffer circuit 53 is delayed with respect to the control signal ULEN by a predetermined time Δ, as illustrated in FIG. 4C. The timing at which the control signal ULEN rises will be hereinafter referred to as time t1. The timing at which the control signal ULEN_dl rises will be hereinafter referred to as time t2. The timing at which both the control signals ULEN and ULEN_dl fall will be hereinafter referred to as time t3.

Referring back to FIG. 4A, the CMOS switch circuits 50 and 51 are inserted in this order between the corresponding electrode wire WP0 or WP1 and the Rx terminal. A wire coupling an output terminal of the CMOS switch circuit 50 and an input terminal of the CMOS switch circuit 51 will be hereinafter referred to as "intermediate wire MIDW." The control signal ULEN is supplied to a control terminal of the CMOS switch circuit 50. The control signal ULEN_dl is supplied to a control terminal of the CMOS switch circuit 51. The NMOS 52 is coupled between the intermediate wire MIDW and the power supply wire to which the ground potential VSS is supplied. An inverted signal of the control signal ULEN_dl is supplied to a control terminal of the NMOS 52.

With the above-described configuration, as illustrated in FIG. 4C, the CMOS switch circuit 50 is turned on at the time t1 and turned off at the time t3. As a result, the CMOS switch circuit 50 is coupled to the corresponding electrode wire WP0 or WP1 from the time t1 to the time t3. By contrast, the CMOS switch circuit 51 is turned on at the time t2 and turned off at the time t3. This makes the corresponding electrode wire WP0 or WP1 coupled to the Rx terminal during a period between the time t2 and the time t3.

In a case where the NMOS 52 is not included and a high voltage remains in the electrode wires WP0 and WP1, the intermediate wire MIDW becomes a high voltage at the time t1 and the Rx terminal becomes a high voltage at the time t2. In this case, there is a possibility that the Rx circuit 13 coupled to the Rx terminal may be damaged. Therefore, each of the switch circuits 26 and 27 includes the NMOS 52. As illustrated in FIG. 4C, the NMOS 52 remains on until the time t2. The NMOS 52 is temporarily turned off at the time t2, and then turned on again at the time t3. Therefore, even in a case where a high voltage remains in the electrode wires WP0 and WP1 at the time t1, the potential of the intermediate wire MIDW is forcibly neutralized to the ground potential VSS during the period between the time t1 and the time t2. This configuration can, therefore, prevent the Rx terminal from becoming a high voltage at the time t2. In this manner, the switch circuits 26 and 27 function as the Rx guard circuits that prevent the downlink signals DS1 and DS2 from flowing into the Rx terminal.

The initial state of the switch circuits 26 and 27 is preferably such that the electrode wires WP0 and WP1 are coupled to the Rx terminal. This is to receive the uplink signal US at any time. With the configuration illustrated in FIG. 4A, when the Rx terminal is decoupled from the electrode wires WP0 and WP1, the Rx terminal is quickly decoupled in response to the deactivation of the control signal ULEN. This configuration can, therefore, prevent a situation in which, when the level shifter 22 starts outputting the downlink signals DS1 and DS2, the switch circuits 26 and 27 fail to decouple the Rx terminal in time and a part of the downlink signals DS1 and DS2 is supplied to the Rx terminal.

Figure 5A:
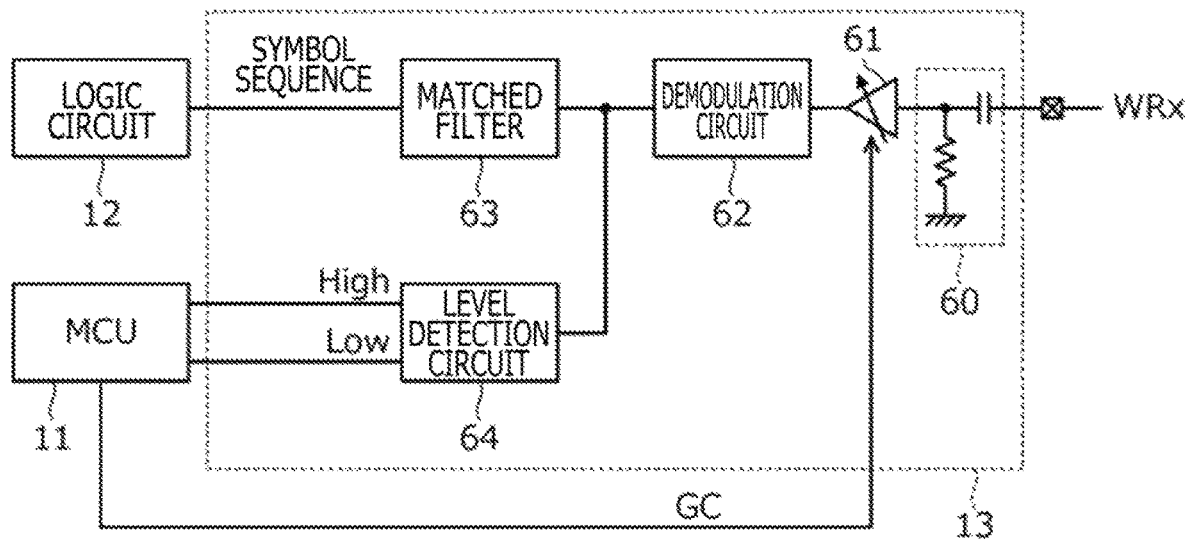
FIG. 5A is a diagram illustrating an internal configuration of an Rx circuit.
Figure 5B:
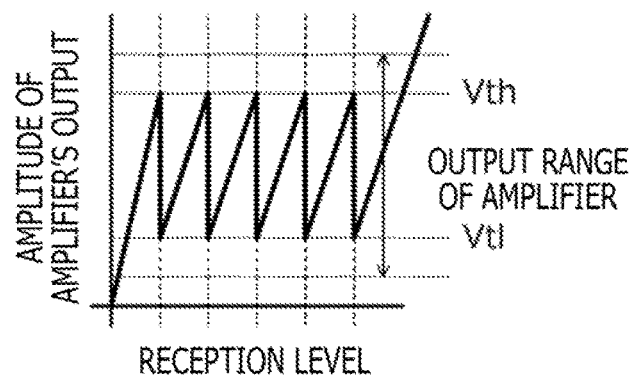
FIG. 5B is a diagram illustrating a relationship between a reception level of an uplink signal and an amplitude level of a signal output from a variable gain amplifier.
Figure 5C:
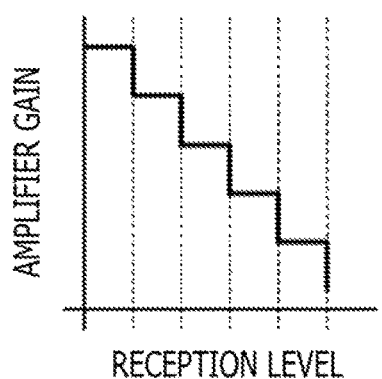
FIG. 5C is a diagram illustrating a relationship between a reception level of the uplink signal and a gain of the variable gain amplifier.

The details of the Rx circuit 13 will be described. FIG. 5A is a diagram illustrating an internal configuration of the Rx circuit 13. FIG. 5B is a diagram illustrating a relationship between a reception level of the uplink signal US and an amplitude level of a signal output from a variable gain amplifier 61. FIG. 5C is a diagram illustrating a relationship between a reception level of the uplink signal US and a gain of the variable gain amplifier 61.

Referring to FIG. 5A, the Rx circuit 13 includes a high-pass filter 60, the variable gain amplifier 61, a demodulation circuit 62, a matched filter 63, and a level detection circuit 64.

The high-pass filter 60 includes, for example, an RC circuit as illustrated in FIG. 5A and removes harmonics that appear in the Rx wire WRx. The variable gain amplifier 61 is a reception amplifier circuit (reception amplifier) capable of controlling a gain and amplifies the uplink signal US supplied from the HVIC 20 via the Rx wire WRx. The demodulation circuit 62 obtains the above-described spread code sequence by demodulating the uplink signal US output from the variable gain amplifier 61 using a predetermined modulation method (for example, pulse width modulation). The matched filter 63 is a circuit that calculates a correlation between the spread codes obtained by the demodulation circuit 62 and a plurality of pre-stored spread codes, and supplies a resulting symbol sequence to the logic circuit 12. On the basis of the symbol sequence supplied in this manner, the logic circuit 12 receives the uplink signal US (the detection pattern and the command) transmitted from the position detection device 2.

The level detection circuit 64 detects the amplitude level of the signal output from the variable gain amplifier 61 by referring to the demodulation result of the demodulation circuit 62. The level detection circuit 64 has two types of outputs: high and low. In a case where the detected amplitude level exceeds a threshold value Vth illustrated in FIG. 5B, the level detection circuit 64 activates the high output. In a case where the detected amplitude level is lower than a threshold value Vtl (<Vth) illustrated in FIG. 5B, the level detection circuit 64 activates the low output. The MCU 11 monitors the output of the level detection circuit 64 and generates a control signal GC for controlling the gain of the variable gain amplifier 61 on the basis of the result.

The gain control using the control signal GC will be described in detail below. The MCU 11 controls the gain of the variable gain amplifier 61 in a plurality of stages. Specifically, the MCU 11 decreases the gain of the variable gain amplifier 61 by one stage in response to the activation of the high output of the level detection circuit 64. The MCU 11 increases the gain of the variable gain amplifier 61 by one stage in response to the activation of the low output of the level detection circuit 64. Through this control, as illustrated in FIG. 5C, as the reception level of the uplink signal US (the amplitude level at the time when the uplink signal US has been received by the electrodes P0 and P1) increases, the gain of the variable gain amplifier 61 gradually decreases. As a result, as illustrated in FIG. 5B, the amplitude level of the signal output from the variable gain amplifier 61 can be maintained between the threshold value Vth and the threshold value Vtl on the condition that the reception level is within a predetermined range.

With the pen 1 according to the present embodiment, as described above, since the downlink signals DS1 and DS2 are generated by the LVIC 10, which is manufacturable by the low-withstand voltage process, the circuit area and power consumption of the HVIC 20, which needs to be manufactured by the high-withstand voltage process, can be reduced accordingly. Therefore, the pen 1 according to the present embodiment is capable of transmitting the downlink signals DS1 and DS2 at a sufficiently high voltage while achieving reduced circuit area and power consumption.

With the pen 1 according to the present embodiment, moreover, the external coil 42 of 1 µH or higher, which cannot be provided in an integrated circuit, is provided outside the LVIC 10 and the HVIC 20 and is included in the step-up circuit 40. With this configuration, the downlink signals DS1 and DS2 having a high voltage (for example, 20 volts) can be obtained in the HVIC 20.

With the pen 1 according to the present embodiment, moreover, the switch circuits 26 and 27 function as the Rx guard circuits. This configuration can prevent the Rx circuit 13 from being damaged by the downlink signals DS1 and DS2.

With the pen 1 according to the present embodiment, moreover, the reception amplifier in the Rx circuit 13 serves as the variable gain amplifier 61, and the gain of the variable gain amplifier 61 is controlled on the basis of the amplitude level of the signal output from the variable gain amplifier 61. With this configuration, the amplitude level of the signal output from the variable gain amplifier 61 can be maintained between the threshold value Vth and the threshold value Vtl.

Next, the pen 1 according to the second embodiment of the present disclosure will be described. The pen 1 according to the present embodiment is different from the pen 1 according to the first embodiment in that the pen 1 is capable of operating in a mode (hereinafter, referred to as "reflective mode") that causes the position detection device 2 to detect the pen 1 as a finger by transmitting, from the pen-tip electrode P0 or the ring electrode P1, a second signal obtained by inverting the phase of a first signal received by the pen-tip electrode P0 or the ring electrode P1. The first signal is intermittently transmitted by the position detection device 2. Specifically, the first signal is a finger detection signal supplied for finger detection from the position detection device 2 to the sensor 3. Except the above-described configuration, the pen 1 according to the second embodiment is similar to the pen 1 according to the first embodiment. In the following description, the same components as the components in the first embodiment will be denoted by the same reference numerals, and the following description will focus on the difference between the pen 1 according to the first embodiment and the pen 1 according to the second embodiment.

Figure 6:
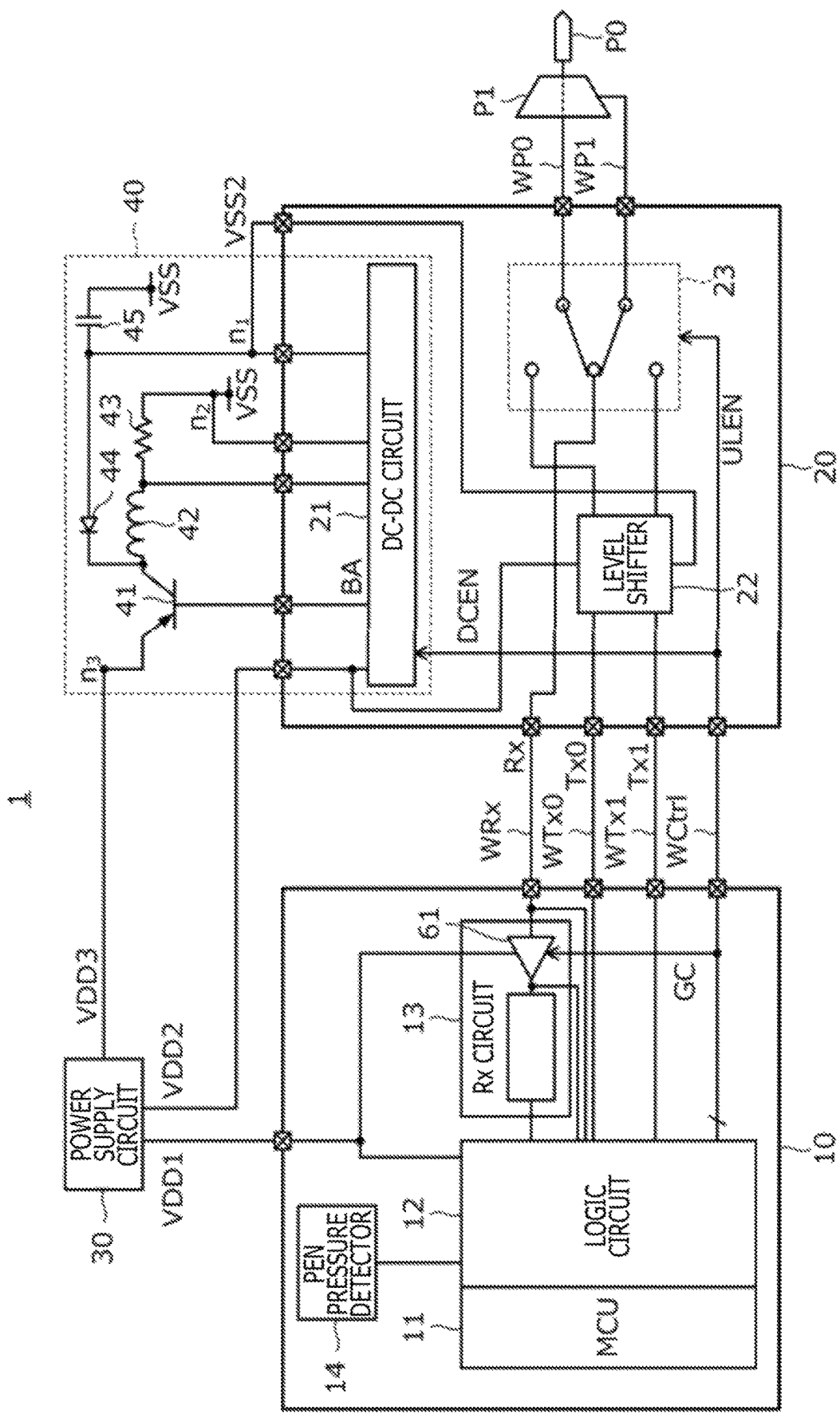
FIG. 6 is a diagram illustrating an internal configuration of the pen according to a second embodiment of the present disclosure.

FIG. 6 is a diagram illustrating an internal configuration of the pen 1 according to the present embodiment. As can be seen from comparison between FIGS. 2 and 6, the pen 1 according to the present embodiment is different from the pen 1 according to the first embodiment in that the Rx terminal and the output terminal of the variable gain amplifier 61 (see FIG. 5A) are electrically and directly coupled to the logic circuit 12.

The logic circuit 12 immediately after starting the operation in the reflective mode controls the high-voltage switch 23 to couple the electrode wire WP1 (and/or the electrode wire WP0) to the Rx terminal. As a result, when the first signal has been received by the ring electrode P1 (and/or the pen-tip electrode P0), the first signal is supplied to the Rx terminal.

The logic circuit 12 operating in the reflective mode refers to the output of the variable gain amplifier 61 to monitor whether the first signal has arrived at the Rx terminal. When the logic circuit 12 has detected the arrival of the first signal at the Rx terminal, the logic circuit 12 generates a second signal obtained by inverting the phase of the first signal, controls the high-voltage switch 23 so as to decouple the electrode wire WP1 from the Rx terminal (switch to the Tx0 terminal and Tx1 terminal sides) at a timing based on the reception timing of the first signal, and also supplies the second signal to one or both of the Tx0 terminal and the Tx1 terminal. As a result, the second signal is transmitted from one or both of the pen-tip electrode P0 and the ring electrode P1. Thus, it appears to the position detection device 2 as if the first signal has been absorbed. This configuration can, therefore, cause the position detection device 2 to detect the pen 1 as a finger.

The logic circuit 12 also executes a mute logic for grounding the Rx terminal at the timing based on the reception timing of the first signal. This configuration can prevent oscillation caused by leakage of the second signal to the Rx terminal.

Figure 7:
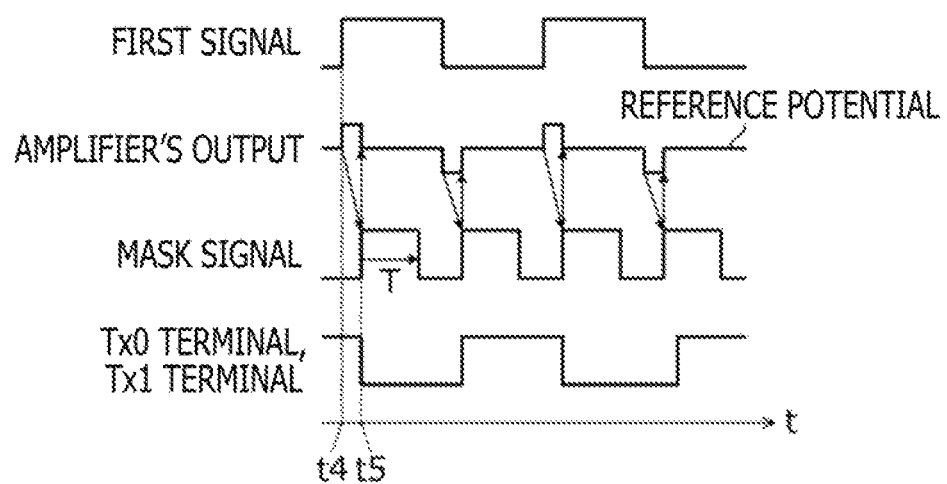
FIG. 7 is a waveform diagram for describing operation of a logic circuit in a reflective mode.

FIG. 7 is a waveform diagram for describing the operation of the logic circuit 12 in the reflective mode. The reflective mode will be described in more detail with reference to FIG. 7. With the predetermined reference potential serving as the center, the variable gain amplifier 61 operates so as to make the output high at a rising edge of the first signal while making the output low at a falling edge of the first signal. When the logic circuit 12 has detected the arrival of the first signal at the Rx terminal by referring to the output of the variable gain amplifier 61, the logic circuit 12 activates a mask signal, which is an internal signal, and keeps the mask signal active during a predetermine period T starting from a timing (time t5) based on a timing (time t4). The time t4 is the time when the logic circuit 12 has detected the arrival of the first signal at the Rx terminal. The time t5 is preferably the time after sufficient time has passed since the time t4 to allow the logic circuit 12 to generate the second signal. While the mask signal is active, the logic circuit 12 fixes the potential of the Rx terminal to the above-described reference potential (mute logic), generates the second signal obtained by inverting the phase of the first signal, and supplies the second signal to one or both of the Tx0 terminal and the Tx1 terminal. As described above, this configuration can cause the position detection device 2 to detect the pen 1 as a finger, and at the same time, prevent oscillation caused by leakage of the second signal to the Rx terminal.

As described above, in addition to the advantageous effects of the first embodiment, the pen 1 according to the present embodiment provides advantageous effects that can cause the position detection device 2 to detect the pen 1 as a finger, and at the same time, prevent oscillation caused by leakage of the second signal to the Rx terminal.

Although the preferred embodiments of the present disclosure have been described, it is to be understood that the present disclosure is not limited to the above-described embodiments and may be implemented in various embodiments without departing from the scope of the present disclosure.

What is claimed is:

1. A pen comprising:
   an electrode;
   a power supply circuit which, in operation, supplies a first voltage;
   a first integrated circuit coupled to the power supply circuit, wherein the first integrated circuit, in operation, outputs a transmission signal at the first voltage;
   a second integrated circuit including a level shifter which, in operation, outputs the transmission signal at a second voltage that is higher than the first voltage;
   an inter-integrated circuit wire which, in operation, supplies the transmission signal having the first voltage from the first integrated circuit to the second integrated circuit;
   an electrode wire which, in operation, supplies the transmission signal having the second voltage from the second integrated circuit to the electrode; and
   a step-up circuit coupled to the power supply circuit, wherein the step-up circuit, in operation, supplies the second voltage to the level shifter,
   wherein the second integrated circuit further includes:
      an Rx terminal which, in operation, outputs a reception signal received by the electrode;
      a Tx terminal which, in operation, receives the transmission signal, and
      a switch which, in operation, switches a destination to which the electrode wire is coupled between the Rx terminal and the Tx terminal,
   wherein the inter-integrated circuit wire includes:
      an inter-integrated circuit Rx wire coupled to the Rx terminal, and
      an inter-integrated circuit Tx wire coupled to the Tx terminal,
   wherein the inter-integrated circuit Rx wire and the inter-integrated circuit Tx wire are provided independently of each other,
   wherein the electrode wire, in operation, is shared between the transmission signal and the reception signal,
   wherein the electrode includes:
      a first electrode provided at a tip of the pen, and
      a second electrode having a ring shape,
   wherein the electrode wire includes:
      a first electrode wire coupled to the first electrode, and
      a second electrode wire coupled to the second electrode,
   wherein the Tx terminal includes:
      a first Tx terminal corresponding to the first electrode, and
      a second Tx terminal corresponding to the second electrode,
   wherein the inter-integrated circuit Tx wire includes:
      a first inter-integrated circuit Tx wire coupled to the first Tx terminal, and
      a second inter-integrated circuit Tx wire coupled to the second Tx terminal, and
   wherein the Rx terminal and the inter-integrated circuit Rx wire are provided commonly for the first electrode and the second electrode.

2. The pen according to claim 1,
   wherein the step-up circuit includes an external coil provided outside the first integrated circuit and the second integrated circuit and wherein the external coil, in operation, is controlled by a first control signal supplied from the first integrated circuit.

3. The pen according to claim 2,
   wherein the step-up circuit includes the external coil and a circuit provided in the second integrated circuit.

4. The pen according to claim 2,
   wherein the step-up circuit, in operation, generates the second voltage by performing on/off control of a current that flows through the external coil.

5. The pen according to claim 1,
   wherein the switch includes an Rx guard circuit which, in operation, prevents the transmission signal from flowing into the Rx terminal.

6. The pen according to claim 5,
   wherein the Rx guard circuit, in operation, sets a potential of a wire coupled to the Rx terminal to a predetermined potential.

7. The pen according to claim 1,
   wherein, in an initial state of the switch, the electrode wire is coupled to the Rx terminal.

8. The pen according to claim 1,
   wherein the switch, in operation, withstands the second voltage.

9. The pen according to claim 8,
   wherein the switch, in operation, withstands a voltage of 10 volts.

10. The pen according to claim 1,
    wherein the second integrated circuit includes a merging circuit which, in operation, couples the first electrode wire and the second electrode wire to the Rx terminal at a time of reception of the reception signal.

11. The pen according to claim 1,
    wherein the switch, in operation, is controlled by a second control signal supplied from the first integrated circuit.

12. The pen according to claim 1,
    wherein the first integrated circuit includes a reception amplifier which, in operation, amplifies the reception signal.

13. The pen according to claim 1,
    wherein the pen operates in a reflective mode that causes a position detection device to detect the pen by transmitting, from the first electrode or the second electrode, a second signal obtained by inverting a phase of a first signal received by the first electrode or the second electrode.

14. The pen according to claim 13,
    wherein the second signal is transmitted at a timing based on a reception timing of the first signal.

15. The pen according to claim 14,
    wherein a potential of the Rx terminal is fixed to a predetermined reference potential at the timing based on the reception timing of the first signal.

* * * * *